United States Patent
Marelli et al.

(10) Patent No.: US 6,827,884 B2
(45) Date of Patent: Dec. 7, 2004

(54) METHOD AND APPARATUS FOR MANUFACTURING AN OPTICAL FIBRE CABLE AND CABLE SO MANUFACTURED

(75) Inventors: Paolo Marelli, Arosio (IT); Fabio Bau', Cassano Magnago (IT)

(73) Assignee: Pirelli Cavi e Sistemi S.p.A., Milan (IT)

(*) Notice: Subject to any disclaimer, the term of this patent is extended or adjusted under 35 U.S.C. 154(b) by 562 days.

(21) Appl. No.: 09/892,464

(22) Filed: Jun. 28, 2001

(65) Prior Publication Data
US 2002/0096793 A1 Jul. 25, 2002

Related U.S. Application Data

(63) Continuation of application No. PCT/EP99/09647, filed on Dec. 6, 1999.
(60) Provisional application No. 60/116,229, filed on Jan. 15, 1999.

(30) Foreign Application Priority Data
Dec. 29, 1998 (EP) .............................. 98124775

(51) Int. Cl.⁷ ............................................. B29D 11/00
(52) U.S. Cl. ....................... 264/1.28; 264/1.29; 264/2.7
(58) Field of Search ............................... 264/1.28, 2.7, 264/1.6, 210.1, 171–13, 1.29; 425/113, 114

(56) References Cited

U.S. PATENT DOCUMENTS

| | | | |
|---|---|---|---|
| 4,414,165 A | 11/1983 | Oestreich et al. | |
| 4,585,406 A | * 4/1986 | Ravela | 425/113 |
| 4,772,435 A | * 9/1988 | Schlaeppi et al. | 264/1.29 |
| 4,871,499 A | 10/1989 | Audoux et al. | |
| 5,372,757 A | 12/1994 | Schneider | |

FOREIGN PATENT DOCUMENTS

| | | |
|---|---|---|
| EP | 0 235 753 A1 | 9/1987 |
| GB | 2 079 970 A | 1/1982 |

OTHER PUBLICATIONS

Yuji, K., "Preparation of Core Wire of Optical Fiber", Patent Abstracts of Japan, JP No. 58223636, Dec. 26, 1983, (1 Page).

Nobuo, I., "Production of Optical Fiber Core", Patent Abstracts of Japan, JP No. 58190842, Nov. 7, 1983, (1 Page).

Shinzo, Y., "Production of The Core For Optical Fiber", Patent Abstracts of Japan, JP No. 58185456, Oct. 29, 1983, (1 Page).

* cited by examiner

Primary Examiner—Mathieu D. Vargot
(74) Attorney, Agent, or Firm—Finnegan, Henderson, Farabow, Garrett & Dunner, L.L.P.

(57) ABSTRACT

Undesired and unforeseeable shrinkage may occur in a tube of plastic material containing optical fibres following its manufacture, especially during storage when the tube is wound on a reel. As a result, there may be uncontrollable variations of the ratio between length of the tube and length of the optical fibre contained therein ("excess fibre variation"). A method and equipment for limiting the excess fibre variations in a plastic tube, by stretching the tube by a predefined amount during manufacturing are described. The present invention also relates to a plastic tube subjected to a predefined stretching, a cable made of such a tube and the equipment suitable for manufacturing such a tube.

10 Claims, 9 Drawing Sheets

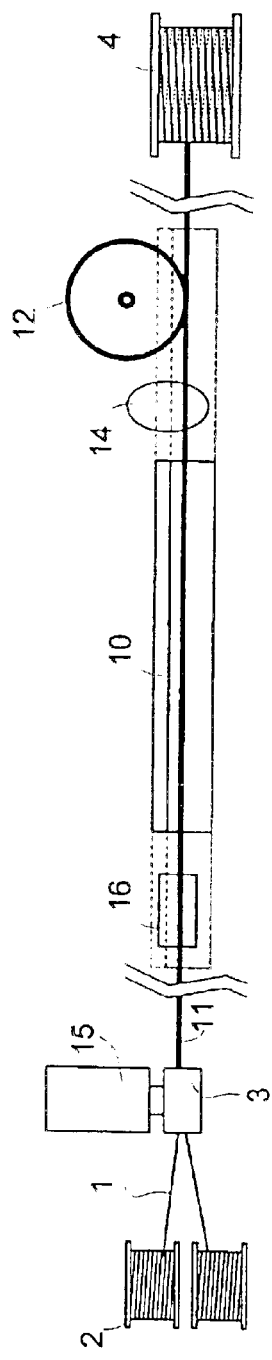
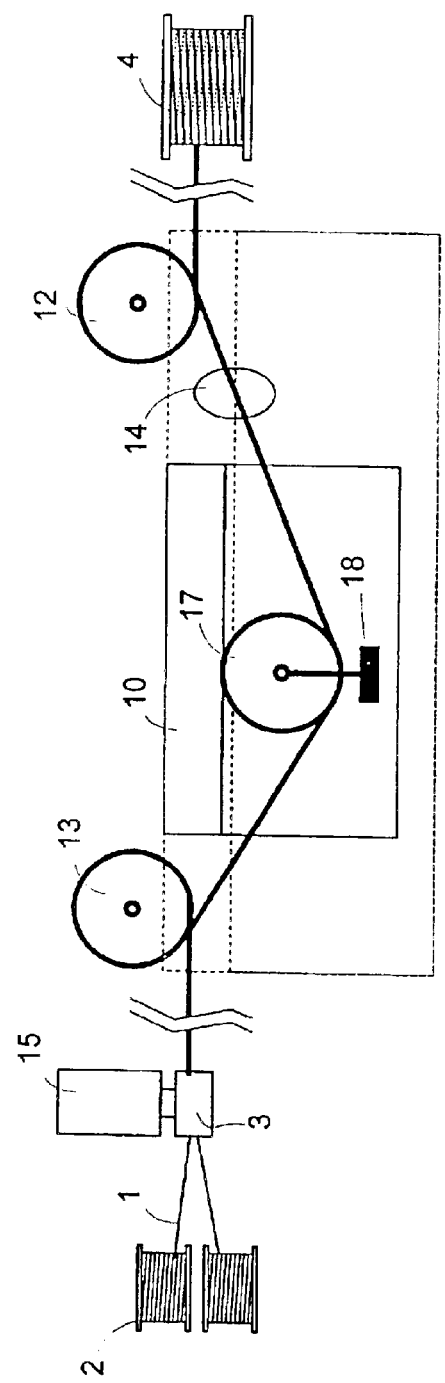

METHOD AND APPARATUS FOR MANUFACTURING AN OPTICAL FIBRE CABLE AND CABLE SO MANUFACTURED

CROSS REFERENCE TO RELATED APPLICATIONS

This application is a continuation of International Application No. PCT/EP99/09647, filed Dec. 6, 1999, and claims the priority of EP98124775.2, filed Dec. 29, 1998, and the benefit of U.S. Provisional application No. 60/116,229, filed Jan. 15, 1999, the contents of all of which are relied upon and incorporated herein by reference.

The present invention relates to a method for manufacturing optical cables, particularly for manufacturing optical cables containing optical fibres loosely placed and a cable so manufactured.

More specifically, one aspect of this invention concerns a method for controlling the amount of optical fibre in an elongated jacket suitable for containing the optical fibre, specifically a tubular element, typically made of plastic.

Additional aspects of this invention concern an optical element, consisting of a tubular element containing one or more optical fibres of controlled length, a method for manufacturing this optical element and a cable comprising this optical element.

Currently, the optical fibre manufacturing method consists in loosely inserting one or more optical fibres inside a plastic tube to form the so-called "optical core" of the cable. This element, also known as "loose tube" or "buffer tube", can then be used, in different configurations, to manufacture optical cables, singly or in groups of several tubes. These tubes can contain either single optical fibres, or groups of optical fibres grouped in one or more bundles, or one or more ribbons. Typically, the tubes also contain a filler, e.g. grease, to prevent water from accidentally seeping into the tube and propagating longitudinally inside.

The length of the fibres in the tubes (single, bundles or ribbons) can be equal to, longer or shorts than the (axial) length of the tube. For the purpose of this description, the difference in length between fibre and tube will conventionally be called "excess fibre". In particular, when the fibre is longer than the tube containing it, the term "positive excess fibre" will be used. On the contrary, when the fibre is shorter than the tube containing it, the term "negative excess fibre" will be used. Finally, the term zero excess fibre will be used to indicate that the length of the fibre is substantially the same as that of the tube containing it.

Typically, the difference in length of the fibre in the tube allows cable structure stretching and shrinking caused by, for example, thermal variations or mechanical handling, to avoid cable length variations from affecting the fibre. In fact, unlike polymers, the vitreous material forming the optical fibre is not very sensitive to the temperature variations that the cable is subjected to during use, but it can present problems if mechanically stretched. Consequently, the length of the fibre in the tube should generally allow the tube to follow the length variations associated with the stresses (mechanical and thermal) it is subjected to, without imposing undesired mechanical traction or other attenuation-causing phenomena on the fibre. For example, positive excess fibre is suitable for high temperature environment or overhead cable optical fibre applications (subject to stretching due to own weight) to compensate for the structural stretching of the cable in order to allow the fibre to follow such stretches without suffering undesired stretches. This ensures that the fibre can follow the stretching without being undesirably stretched itself. On the other hand, for low temperature environment applications of an optical cable, the structural contraction of such cable tends to increase the excess fibre value. In this case, if a positive excess fibre were used, the additional increase of the value could cause excessive fibre bending in the tube, with the risk of inducing signal attenuation. In these cases, the use of negative excess fibre may be suitable.

Typically in the production of loose optical cores, the plastic material is extruded at high temperature around the fibres to form a tube which, once cooled, is wound on special reels.

One method for making loose cables and controlling excess fibre is described in U.S. Pat. No. 4,414,165 by Oestreich et al. This patent describes a method and equipment for forming an optical transmission element with loose optical fibres in a tubular jacket containing filling material.

Another method for producing loose cables and controlling fibre length, with respect to the length of the tube containing the fibre, is described in U.S. Pat. No. 5,372,757 by Schneider et al. In particular, as described in this patent, a traction force at high temperature is applied to the plastic tube and to the optical fibres. The tube is then cooled, maintaining the traction force. The applicant, however, has observed that in the lapse of time between tube production and subsequent application, e.g. to make an optical cable employing this tube, undesired and unforeseeable longitudinal shrinking can occur, with consequent uncontrollable variations of the ratio between tube length and fibre length.

Consequently, as observed by the applicant, excess fibre variations must be controlled both during the excess fibre controlling stage on the extrusion line and during the period from production of the tube, which is typically wound on a reel at the end of the production process, to its subsequent employment for making the cable. Typically, storage times (i.e. the time in which the tubes are wound on the reel before being used to make the cable) vary from several hours to approximately one week.

In particular, the applicant has observed that once the optical cores, made according to known techniques, are collected on a reel, the plastic material forming the tube tends to additionally settle and, in particular, shrink. This settling generally cannot be foreseen; however, it usually causes additional tube shrinking leading to uncontrollable variations—usually increases—of the set excess fibre values.

The shrinking observed by the applicant in some cases results in sizes comparable to the excess fibre value set in production, with the result of substantially modifying the final excess fibre value and creating problems in the subsequent use of the tube in making the optical cables.

In particular, the applicant has observed that, at high production speeds, the tube is typically wound on the reel in random crossed turns. This unorderly tube winding generates gaps randomly distributed on the tube skein collected on the reel. The tube may detensionate more easily near these gaps and shrink, while detensioning may be obstructed in other areas. This causes different, uncontrolled shrinking of the tubes wound on different reels and also along different lengths of the same tube wound on the same reel.

Having defined the problem, the applicant has found a solution to eliminate, or at least minimize, these length variations during the storage of plastic tubes containing optical fibres, by stretching the material forming the tube containing the optical fibres by a predefined amount.

One aspect of this invention, therefore, relates to a method for producing polymeric material tubes associated with one or more optical fibres comprising the following steps:

feeding at least one optical fibre along a path to an extruder;

extruding the polymeric material around said optical fibre to form the tube;

cooling the tube to a predefined final temperature; the following steps are performed during cooling:

applying a first traction force to the tube containing said optical fibre in a first section of said extrusion line;

applying a second traction force to said tube in a second section of said extrusion line, in substantial absence of congruence between said fibre and said tube since said second traction force is greater than said first traction force;

applying a third traction force to said tube in a third section of said extrusion line, said third traction force being less than said second traction force;

said second traction force will reduce tube longitudinal shrinking by at least 20% after a storage period of one week or longer immediately after extrusion, compared to a similar tube which is not stretched.

Preferably, such second traction force is applied at a tube temperature when the modulus of elasticity of the polymeric material is approximately 2000 Mpa, preferably between approximately 100 Mpa and approximately 2000 Mpa, or more preferably between approximately 300 Mpa and approximately 1500 Mpa.

Preferably, said final temperature is lower than approximately 40° C., preferably approximately 20° C.

The tube temperature variation during the application of the second traction force is limited.

Preferably, the temperature variation in the tube length subjected to the traction force is lower than approximately 10% of the total thermal gap subjected by the tube along the extrusion line. Preferably, the temperature variation in the tube length subjected to said second traction force is lower than approximately 20° C. and more preferably lower than approximately 10° C.

According to a preferred embodiment, said second traction force is predefined to induce a stretching of approximately 1% or more when the polimeric materials of the tube is polybutyleneterephthalate (PBT).

A second aspect of this invention relates to a polymer tube produced by extrusion comprising one or more optical fibres, allocated inside said tube, characterized by the fact that, during production, said tube is subjected to stretching so that its longitudinal shrinkage is 20% or more less than that of a tube which was not stretched, after a storage period of one week or longer immediately following extrusion.

Preferably, said tube should be made of polybutyleneterephthalate (PBT), polyethylene (PE) or polypropylene (PP) polymeric material.

Preferably, such stretching is approximately 1% or more for PBT polymeric material tubes.

In a further aspect, this invention relates to equipment for making a tube containing one or more optical fibres comprising:

an extruder suitable for producing a plastic material tube containing one or more optical fibres;

one or more cooling pools;

a stretching device suitable for applying traction to a length of said tube, with temperature variations in said tube length 10% lower than the total thermal head of the tube from extruder to ambient temperature.

In particular, this stretching device comprises a driving element and a braking element, located between the extruder and said driving element.

Said driving element can comprise a drive wheel or a pair of drive tracks. The braking element can comprise, in turn, a second drive wheel or pair of drive tracks where the tube is fed at a lower speed with respect to the speed of the tube at the driving element. Alternatively, such braking element can either be an idle wheel around which the tube is wound by one complete turn and to which a braking force is applied, or an inflatable sleeve with a substantially circular central opening in which the tube slides.

Preferably, said stretching device comprise a first drive wheel, set at a first revolution speed, and a second wheel, set at a slower revolution speed than the first.

Alternatively, said stretching device comprise:

a first drive device, suitable for stretching said tube at a first speed;

a second driving element, set at a speed substantially equal to the speed of said first drive device;

a third element, located between said two driving elements, suitable for applying a force directly perpendicular to said tube feeding direction on the length of the tube between the two driving elements.

Alternatively, the stretching device comprise:

a driving element;

a braking element, comprising two set of rollers between which the tube is fed; being such two set of rollers arranged alternatively at opposite ends with respect to the central tube axis so that the distance between the lower surface tangent of the upper set and the upper surface tangent of the lower set is smaller than the diameter of the tube by a certain value to cause predefined stretching of the tube.

The present invention will be better explained by the following detailed descriptions, with reference to the accompanying figures, where:

FIG. 3 shows a schematic example of an extrusion line with a second example of equipment according to the present invention;

FIG. 4 shows a schematic example of an extrusion line with a third example of equipment according to the present invention;

Figure 7:
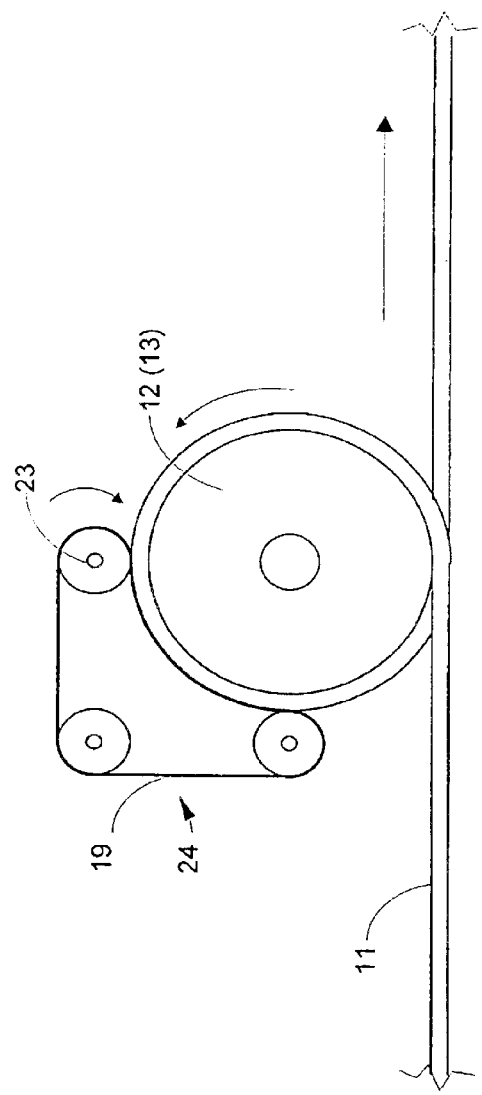
Figure 6:
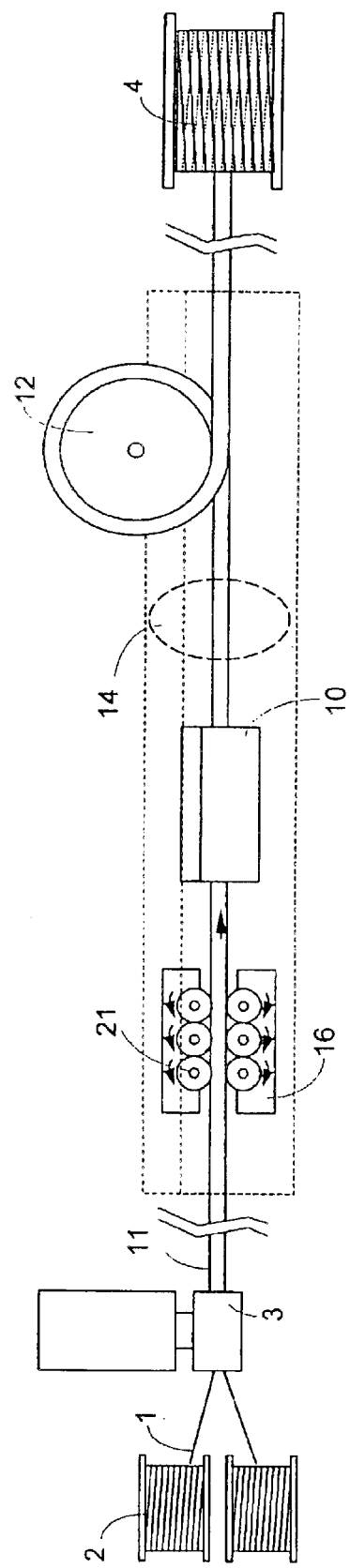
Figure 9:
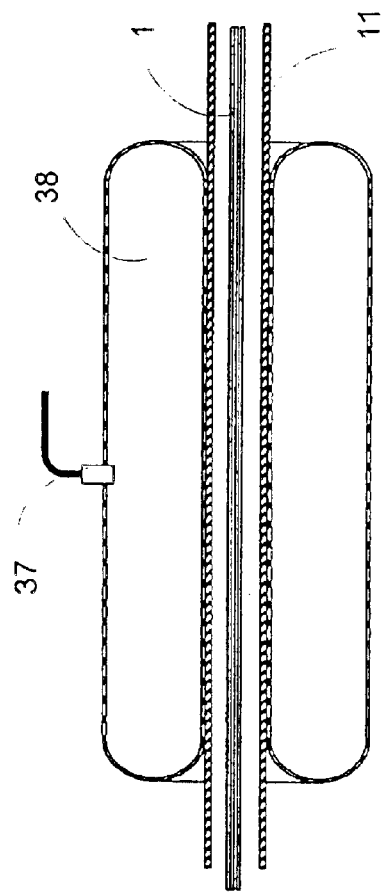
Figure 8:
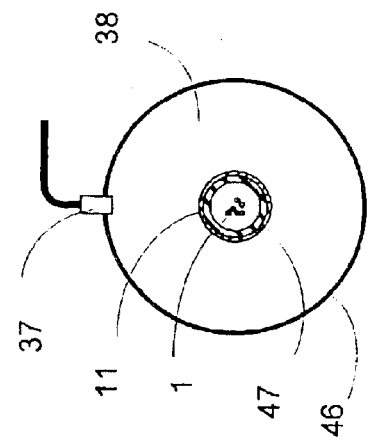
Figure 10:
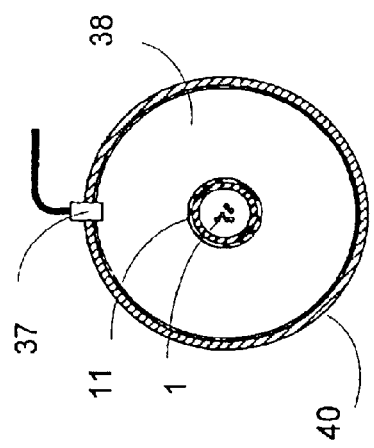
Figure 11:
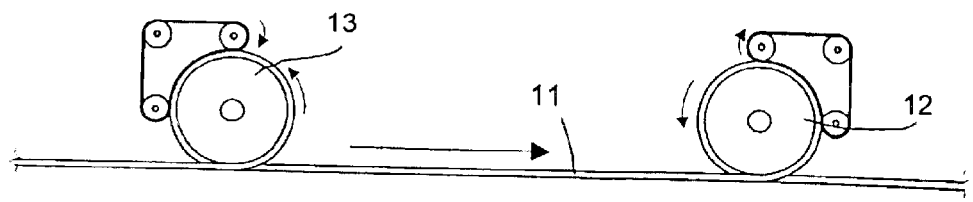
Figure 12:
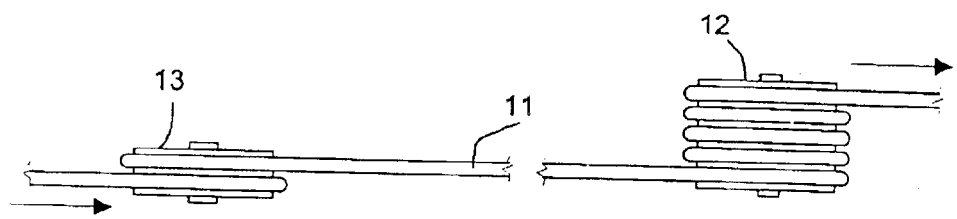
Figure 13:
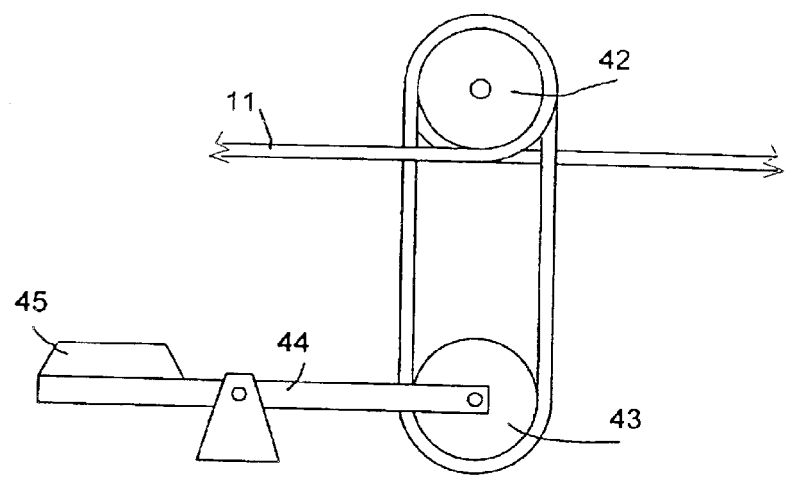
Figure 14:
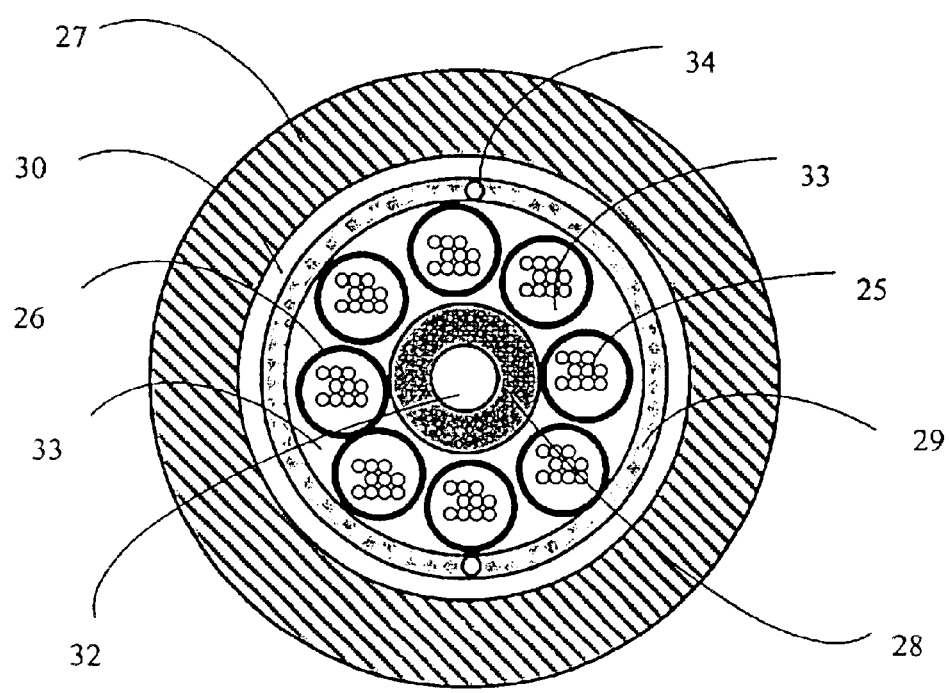
Figure 15:
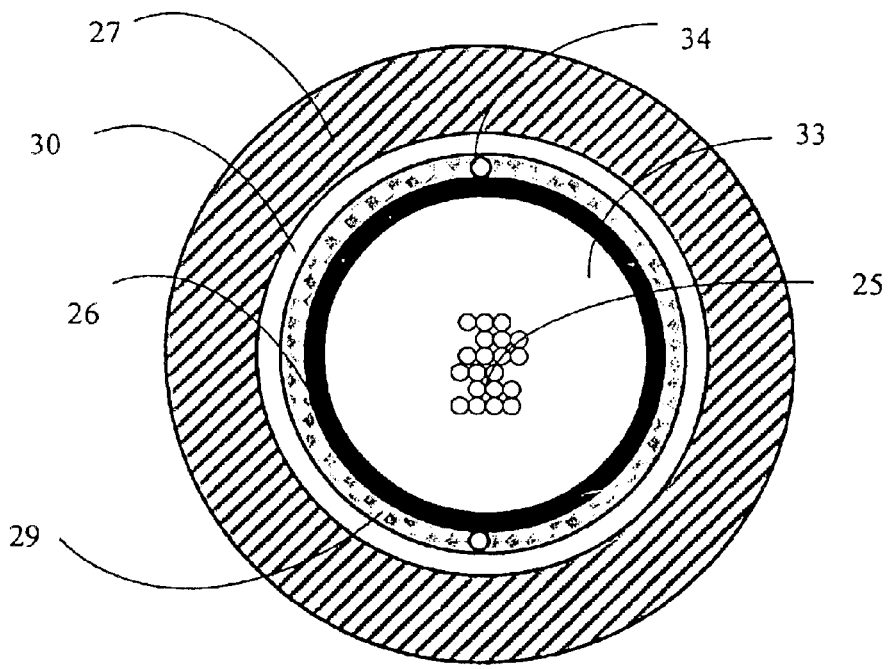
Figure 16:
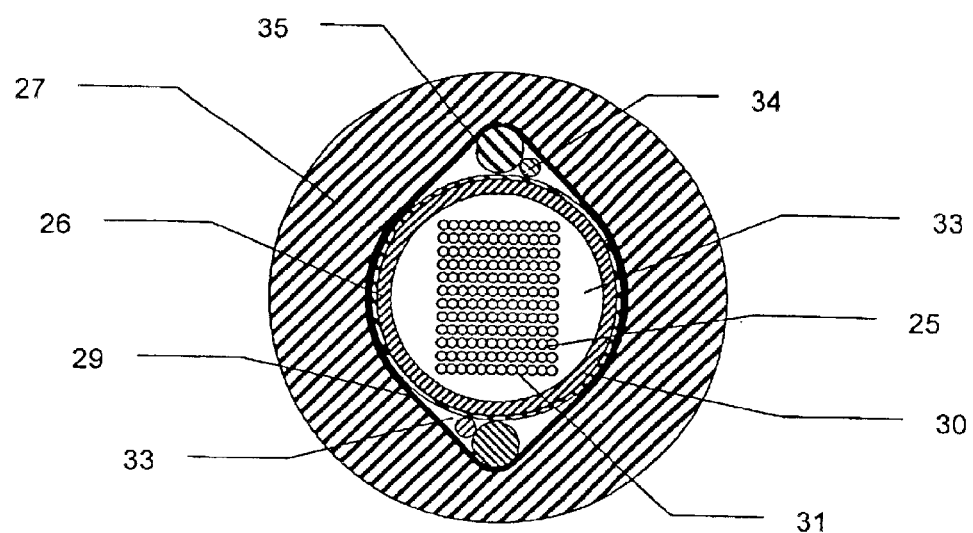
Figure 17:
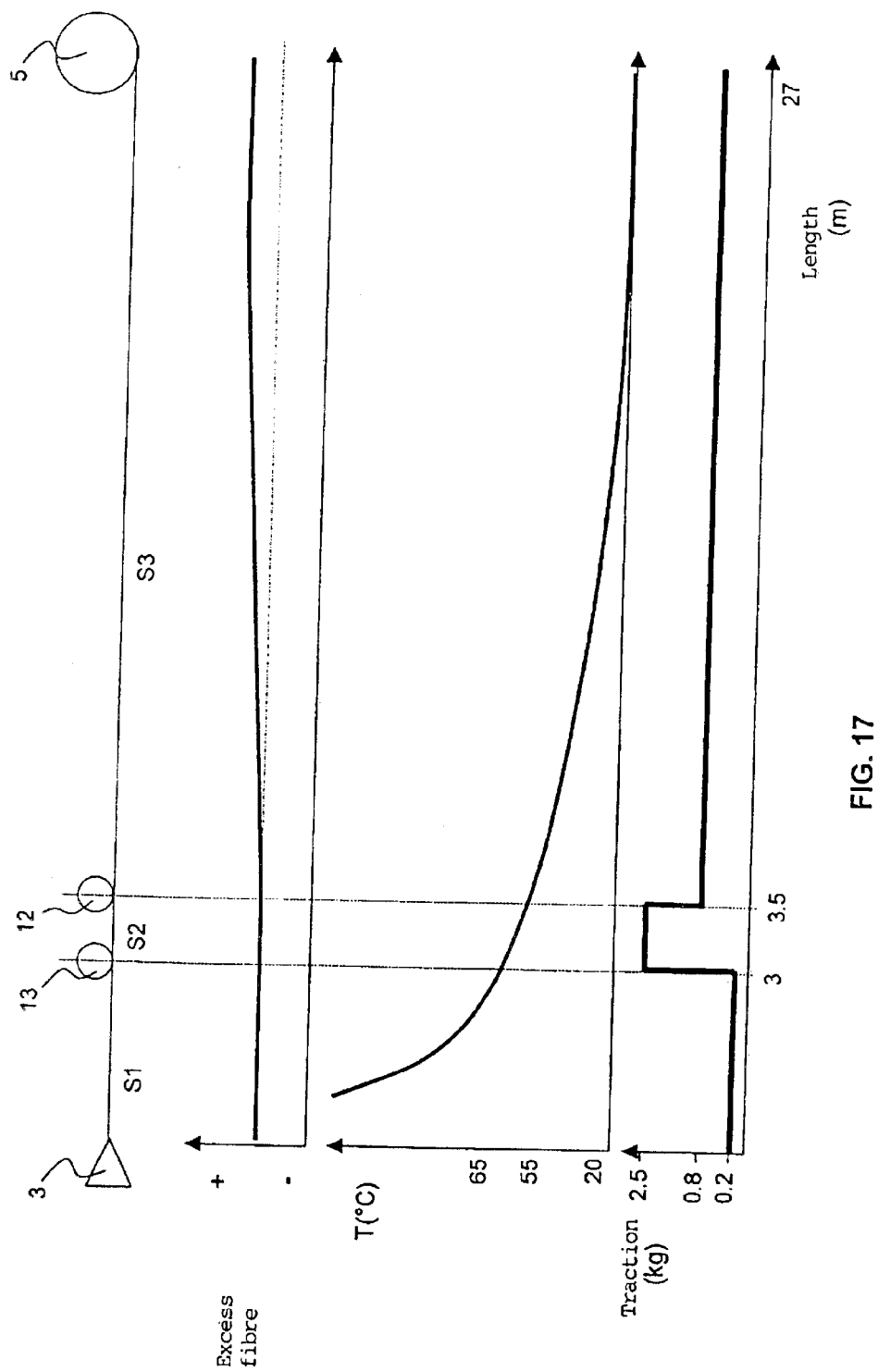

FIG. 6 schematically illustrates a first example of a driving element suitable for imposing a predefined speed on the tube in the aforesaid equipment in order to achieve the desired tube stretching;

FIG. 7 schematically illustrates a first example of a driving element suitable for imposing a predefined speed on the tube in the aforesaid equipment so as to achieve the desired tube stretching, comprising a track to prevent the tube from slipping;

FIG. 8 schematically illustrates the front view of a first example of a braking element which can be used to achieve the desired tube stretching, according to the present invention;

FIG. 9 schematically illustrates the side view of the same example as depicted in FIG. 8, according to the present invention;

FIG. 10 schematically illustrates the front view of a second example of a braking element which can be used to achieve the desired tube stretching, according to the present invention;

FIG. 11 schematically illustrates an example of a device with two drive wheels to produce tube stretching;

FIG. 12 shows the bottom view of the same device as depicted in FIG. 16;

FIG. 13 schematically illustrates an example of a buffer;

FIG. 14 schematically illustrates a first example of a cable comprising at least one loose optical fibre plastic tube, according to the present invention;

FIG. 15 schematically illustrates a second example of a cable comprising at least one loose optical fibre plastic tube, according to the present invention;

FIG. 16 schematically illustrates a third example of a cable comprising at least one loose optical fibre ribbon plastic tube, according to the present invention; and FIG. 17 shows an example of how can vary the traction applied to the tube, the tube temperature and the excess fibre value in the various extrusion line sections, according to a method of the present invention.

Typically, to make a plastic material tube containing inside one or more fibres, such tube is extruded around the optical fibres.

Figure 1:
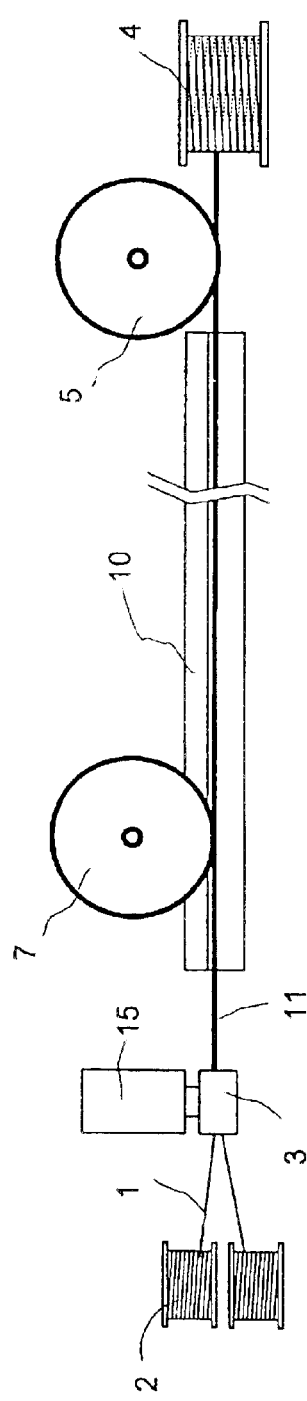
FIG. 1 shows a schematic example of a state of the art extrusion line.

As shown schematically in FIG. 1, a conventional extrusion line for manufacturing a tube containing at least one optical fibre I typically comprises at least one reel from which one or more optical fibres I are taken and sent to an extruder head 3, through which the plastic material is extruded around them, forming a tube 11. The tube 11 is then sent to a cooling device 10, and from there to a stretching device 5 (typically with a diameter of 600 mm to 1000 mm) and then to a final collection reel 4. Optionally, the extrusion line can comprise an additional pulley 7 (also with a typical diameter of 600 mm to 1000 mm) arranged between the stretching element 5 and the extruder.

The fibres and the plastic material tube enclosing them proceed for a certain length along the extrusion line, each independently from the others. The cooling, and consequent shrinking, of the plastic material does not cause excess fibre value variations in this section, as the fibres are not integral with the tube and shrinking is distributed along all the tube part not integrally bound to the fibres.

In order to generate or modify excess fibre, on the other hand, fibres and tube must proceed integrally with respect to each other along the extrusion line, so that the longitudinal shrinking of the plastic tube caused by cooling, generates the desired fibre excess, due to essentially no or considerably less fibre shrinking. The point on the extrusion line where such integral movement of fibre and plastic tube is achieved is called "congruence point" and from this point onwards fibre and tube are defined as "congruent".

Congruence is typically caused by reaching a friction threshold between optical fibres and tube, generally favoured by tube cooling along the extrusion line, and by the possible presence of filler inside the tube.

Under equal process conditions, the congruence point can be shifted along the extrusion line by suitably adjusting the tube cooling arrangement. For example, the congruence point can be moved closer to the extruder by decreasing the temperature in the cooling pool.

Alternatively, congruence between fibre and tube can be mechanically forced at a certain point of the extrusion line. For example, a wheel can be used (e.g. the pulley 7 in FIG. 1) where the tube containing the fibre is wound by a certain number of turns (e.g. two or more) in order to increase friction and prevent the optical fibre from slipping inside the tube. In this way, the desired congruence between fibre and tube is created at the wheel.

Essentially, excess fibre depends on the temperature at which tube and fibre congruence occurs. A higher plastic material temperature at the congruence point will lead to greater shrinking downstream with respect to this point and consequent higher excess fibre generated by shrinking.

So, in an initial approximation:

$$\Delta L/L = a(T)\Delta T$$

$\Delta L$ tube sample stretching

L tube sample length a(T) thermal dilation coefficient (according to temperature)

$\Delta T$ temperature variation between congruence point and end of cooling transient.

Accurate evaluation of the phenomena shall also consider other variables, such as axial stiffness, exchanged traction, filler viscosity, etc., which depends on temperature.

Accordingly, having defined the process conditions and given the characteristics of the plastic material, especially the thermal dilation coefficient, the fibre-tube congruence can be attained at optimal temperature so as to achieve the desired fibre excess.

Typically, at the end of the production process, the final excess fibre in the optical tube is equal to several tenths of a percentage point and, in particular, varies from approximately −3% to approximately +3%, preferably from approximately −1% to approximately +1%.

Controlled tube traction according to this invention is set either by inserting devices along the extrusion line to impose different speeds on two lengths of said tube in a controlled fashion, or by applying a plastic stretching force to the tube. In particular, the traction is higher than that usually applied to tubes under normal extrusion conditions, i.e. preferably 2 to 5 times the traction normally applied to the tube.

Figure 2:
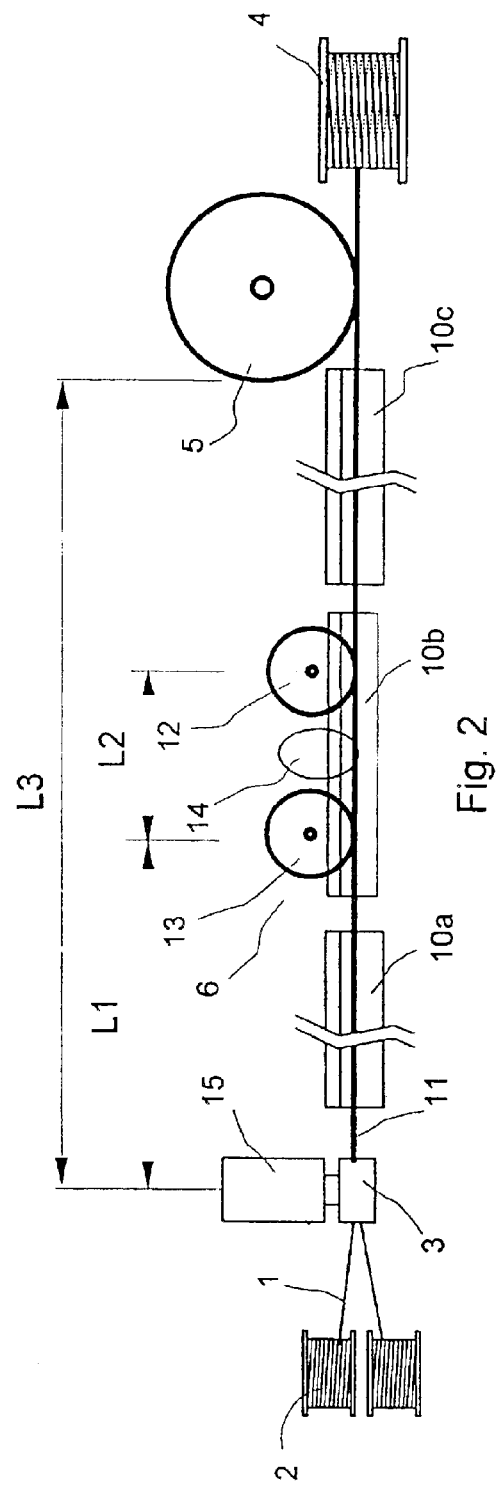
FIG. 2 shows a schematic example of a extrusion line with the first example of equipment according to the present invention.

According to a first example, shown schematically in FIG. 2, the tube 11 from the extruder 15 is subjected to the desired traction force by a device which comprises a first driving element 12 (e.g. a drive pulley with a predefined revolution speed around which the tube is wound for one or more complete turns without slipping) and a second driving element 13 with braking functions, located upstream of the driving element 12 (e.g. a second pulley around which the tube is wound for one or more complete turns without slipping, set at a lower revolution speed than that of the pulley 12). The device is located at a distance L1 from the extruder so that the tube reaches the desired traction application temperature. Such distance also depends on the material type, the tube extrusion speed and coolant temperature. For example, such distance will increase as the extrusion speed and coolant temperature increase. Typically, this distance will be between 1 m and 10 m.

The distance L2 between the two driving elements 12 and 13 will be sufficiently reduced so that the length of tube between the two elements is subjected to limited temperature variations. In principle, such distance is less than one meter, preferably between approximately 200 mm and approximately 500 mm, more preferably between 300 mm and 400 mm.

The tube temperature is taken to desired values for tube stretching by means of one or more cooling pools 10 located along the extrusion line.

In a preferred configuration, several cooling pools 10a, 10b, 10c aligned in sequence are used. The overall longitudinal length L3 of cooling pools should preferably be between 10 m and 50 m and such cooling pools could be filled with coolant at various temperatures.

A particularly preferred configuration foresee the stretching device, comprising two driving elements 12 and 13, should be contained inside a cooling pool 10b.

The tube advances at different speeds on the two driving elements to cause stretching in the length comprised between the driving elements as expressed by the formula:

$$\epsilon = (L_{a11} - L_0)/L_0 = (V_A - V_0)/V_0 = (V_A/V_0) - 1$$

where $L_0$ is the initial tube length, $L_{a11}$ is the length of tube subjected to traction, $V_A$ and $V_0$ are the tube speeds on driving elements 12 and 13, respectively.

A predefined traction on the length of tube between the two driving elements 12 and 13 is applied by suitably setting the revolution speed of the two driving elements 12 and 13 for stretching.

According to this invention, the traction applied to such length of tube is higher than the traction applied to the tube in other extrusion line sections, in particular in the section following the line section where the stretching device described above is located.

The traction applied to the tube in this section will preferably be 2 to 5 times the traction normally applied in the following extrusion line section, in particular between the element 12 and the drive wheel 5.

For example, if the tube is stretched by a traction force of approximately 1 kg in the section between the pulley 12 and the drive wheel 5, such tube can be advantageously subjected to a traction of approximately 2.5–3 kg in the section between the pulleys 12 and 13.

Stretching of the plastic material of the tube is performed before congruence is achieved between tube and fibre. In this way, during tube stretching, the fibres move independently with respect to the tube and consequently are not subjected to the stretching traction stress imposed on the tube.

The optical fibres can generally resist stretching of up to 0.3% without being damaged. Once this threshold is exceeded, stresses may be created in the fibre which generally cause attenuation of the transmitted signal.

Without congruence, as a result, the tube can be stretched by a relatively high amount, e.g. in the order of 1% or more, without subjecting the optical fibres to undesired stress.

Regardless of the type of device used to apply the traction force on the tube, the length of tube subjected to traction should nevertheless be limited so that the stretched length of tube is subjected to limited temperature variations.

If the tube temperature variation is limited, the polymer modulus of elasticity is also subjected to limited variations, thus allowing better process condition controlling.

Preferably, the temperature variation in the length of tube subjected to traction should be less than approximately 10% of the total thermal gap of the tube along the extrusion line.

For example, for PBT (polybutyleneterephthalate) polymeric material, which has an extrusion temperature of approximately 300° C., the thermal gap to reach the ambient temperature of 20° C. is approximately 280° C.; an acceptable temperature variation in the length of tube subjected to stretching will accordingly be approximately 28° C.

To further limit variability of the material's modulus of elasticity, the temperature variation in the length of tube subjected to controlled traction should be less than approximately 20° C., preferably less than approximately 10° C.

To limit aforesaid temperature variation, the length of tube subjected to controlled traction should be under one meter, preferably between approximately 200 mm and approximately 500 mm.

FIG. 17 shows a schematic example of the traction, temperature and excess fibre patterns in a tube along the various extrusion line sections shown in FIG. 2. The numeric values of this example are specifically referred to extruding a PBT tube with an internal diameter of 2 mm, external diameter of 3 mm and containing 6 optical fibres with a diameter of 250 µm.

In section S1 (approximately 3 metres long) comprised between the extruder 3 and the wheel 13 of the stretching device, the traction (lower graph) is required to make the tube and fibres proceed along the extrusion line (0.2 kg). In this first section, the tube temperature (middle graph) decreases exponentially by approximately 300° C. at the extruder outlet to approximately 60° C. At this temperature the polymeric material has the desired modulus of elasticity. With no congruence between fibre and tube, the excess fibre value is zero (upper graph).

In section S2 between the two wheels 13 and 12 of the stretching device a traction force of approximately 2.5 kg is applied to the tube at a deformation speed of approximately 0.6 m/min. The length of tube to which the traction is applied is shown in the diagram, for the sake of simplicity, as the length of the tube between the axes of the two pulleys 12 and 13 (approximately 0.5 m).

In this section, the temperature variation is contained within 10° C., so as to minimize the variations of the value of the polymeric material's modulus of elasticity. There is no congruence between the fibres and tube in the section between the two pulleys so the stretching given to the tube is not transmitted to the fibres. Instead congruence between tube and fibres is created by wheel (12) so that the fibres proceed integrally with the tube at the outlet of section S2.

In section S3, the traction applied to the tube is taken to the values normally applied in extrusion lines, in this case approximately 0.8 kg. In this section, the congruence between fibre and tube and the additional temperature decrease (from approximately 60° C. to approximately 20° C.) generate the desired fibre excess (approximately 1%) in the tube by the effect of the thermal shrinking of the polymeric material.

FIG. 7 schematically shows an example of driving element 12 and braking element 13 (according to the configuration shown in FIG. 2). Such element consists of a drive wheel and possible additional apparatus 24 to prevent tube 11 from slipping on said drive wheel.

Said apparatus 24 consists of three idle wheels 23 arranged to form a triangle, between which a belt 19 slides. The apparatus 24 is located so that two of the three idle wheels 23 are disposed over one part of the drive wheel.

The belt 19 is pulled to hold the tube against the drive wheel and prevent undesired slipping of the tube. Belt tension and the length of the belt in contact with the tube 11 are adjusted according to, for example, drive wheel position, tube temperature and tube material. Said part of the belt in contact with the tube is varied by positioning the two idle wheels 23 over the drive wheel so that the belt takes the shape of the wheel. The greater the part of the drive wheel between the two idle wheels, the greater the part of the tube adhering to the belt 19.

If the drive wheel is also used to produce congruence between fibre and tube in the extrusion line, advantageously the tube 11 is wound around the drive wheel a certain number of times to make the tube movement integral with that of the fibres it contains. FIG. 12 shows an example of multiple wrapping (four turns) around a drive wheel. In this case, a three-wheel device with a belt suitable for preventing tube slipping may not be required.

FIG. 6 shows an alternative driving element configuration for pulling the tube along the extrusion line comprising a pair of drive tracks.

The tube 11 is pulled by the specific drive tracks, essentially in a linear fashion, by two sets of drive wheels 21 located on the two opposite sides of the tube. The number of drive wheels 21 of the track (six in the figure) also depends on tube material and on position on the extrusion line, so as to prevent slipping between the polymeric material of the tube and the drive wheels 21 and to avoid undesired and harmful variations of the rated feeding speed of the tube without, however, exerting excessive pressure on the tube. Such driving element can be used instead of one or both drive wheels as shown above, preferably instead of the braking element.

According to an alternative solution, stretching of the tube coming from the extruder is performed by imposing a force directly perpendicular to the direct traction force applied by a first driving element and a second driving element located along the extrusion line and suitable for applying tension to the part of the tube subjected to such force perpendicular to the direct traction force.

For example, as shown schematically in FIG. 4, such force perpendicular to the direct traction force going from a driving elements 13 to a driving elements 12 located along the extrusion line is produced by applying a force (e.g. a weight, a spring or similar) to the tube using a wheel 17 to which a suitably calibrated weight 18 is connected. In this configuration, the driving element 12 makes the tube and fibres congruent.

According to a different configuration example, illustrated schematically in FIG. 3, the stretching of tube 11 coming from the extruder 15 can be performed by imposing a traction force T on the length of tube in a controlled fashion, by means of a stretching driving element 12 and a suitable braking device 16. This is expressed by the following formula:

$$\epsilon = T/EA$$

where EA is the tube axial stiffness.

The tube temperature is taken to the desired values for stretching by means of one or more cooling pools 10 located along the extrusion line. In one configuration example, shown by a dotted line in FIG. 3, the braking element 16 and the stretching driving element 12 are contained inside a cooling pool 10.

According to one configuration example, the braking element 16 consists of sliding shoes and elastic, pneumatic, hydraulic tightening devices or similar.

According to another configuration example, the braking element 16 consists of an idle wheel to which a brake is applied, e.g. a friction brake, around which the tube is wound forming a predefined arch. Preferably, such wheel also comprises a system for preventing tube slipping, e.g. a track with three wheels positioned to form a triangle, as shown schematically in FIG. 7.

According to another configuration example, shown schematically in FIGS. 8 and 9, the braking element 16 consists of a sliding sleeve 38 made of elastic material, with an outer side 46 and an inner side 47 into which the tube 11 containing the optical fibres 1 is fed. The length of the sleeve is mainly defined according to the tube material and its temperature in the position where the braking element 16 is located. This inflatable sleeve 38 is equipped with a fitting 37 attached to an inflation system. The sleeve 38 is inflated by the fitting 37 and taken to a pressure so that the sides of the sleeve 38 in contact with the tube 11 exert a uniform pressure along the entire length of the sleeve 38, regardless of possible variations of the dimension of the extruded tube, so as to brake the tube 11 by friction without damaging or deforming it.

Such braking device allows to reduce to the minimum any undesired tube ovalization occurring when the plastic material is subjected to stretching under excessively high temperature conditions in the presence of unequal stress.

In another configuration, shown schematically in FIG. 10, the inflatable sleeve 38 made of elastic material is surrounded by a stiff casing 40 to prevent dilation of the sleeve 38 in the opposite direction of the tube 11 subsequent to internal pressure of the sleeve 38. The stiff casing 40 ensures that the dilation induced on the inflatable sleeve 38 causes sleeve dilations only in the direction towards the tube 11.

Figure 5:
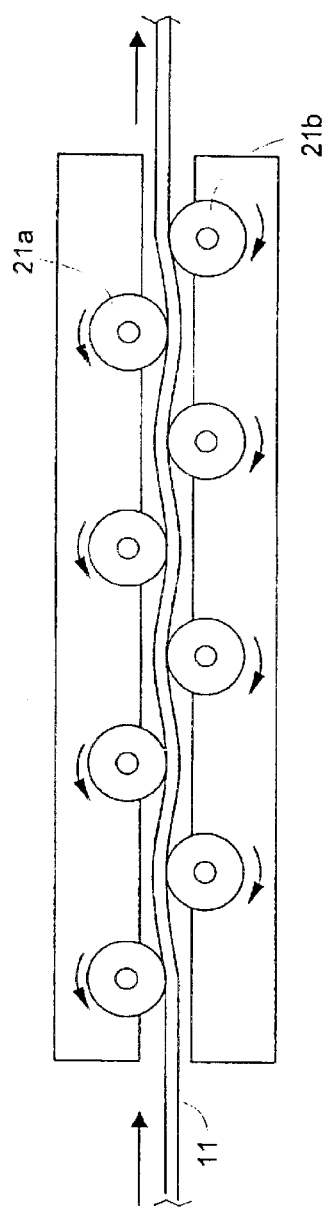
FIG. 5 shows a schematic example of equipment according to the present invention.

Tube stretching can also be produced by coupling a device, such as the one shown schematically in FIG. 5, to a drive wheel 12 between the wheel and the extruder. Such device comprises two sets of displaced axis rollers between which the tube passes. Such two sets of rollers 21a and 21b are arranged alternatively at opposite ends with respect to the central tube axis so that the distance between the lower surface tangent of the upper set 21a and the upper surface tangent of the lower set 21b is less than the diameter of the tube. The deviation from the linear path accordingly imparted to the tube, in the part of the tube subjected to the greatest bending, causes micro-stretches which, added together, provides the desired predefined stretching. Such device in this configuration example is preferable for tubes with a very low modulus of elasticity, e.g. less than 200 Mpa.

The devices mentioned above for stretching the tubes can be mobile and suitably positioned along the extrusion line according to the various requirements, especially to carry out the stretching process at the most convenient temperature.

As mentioned above, the congruence between optical fibres and tube can be set at any point of the extrusion line after the stretching device, using a device consisting of wheels or drums, either idle or, preferably, driven, upon which to wind the tube a certain number of times so as to prevent additional slipping between fibre and tube.

Preferably, congruence is achieved at a driving element that coincide with the driving element 12 shown in FIGS. 2, 3 or 4. This ensures the simplest configuration as the tube stretching device also defines fibre excess.

The excess fibre value can also be controlled during the tube production process, e.g. by comparing revolutions of a wheel located near the fibre feed reel (upstream with respect to the extruder)—turning integrally (without slipping) with the fibre—to the revolutions of a wheel revolving without tube slipping at ambient temperature (i.e. when the thermal shrinking is basically finished), e.g. near the collection drum.

With reference to FIGS. 2, 3 and 4, suitable traction controlling devices 14, suitably located along the length of tube subjected to stretching, are employed to effectively control tube traction.

The traction applied can be effectively controlled by direct measurement, e.g. by means of a "buffer" located along the stretching length or by means of one or more "load cells" located in the braking or driving equipment. The term "buffer" refers to a system, shown schematically in FIG. 13, typically consisting of two freely turning pulleys 42, 43, one of which (42) has a fixed axis of revolution and the other (43) a mobile axis with respect to the axis of pulley 42, preferably fitted either on guides or on a rocking rod 44 and suitably counterbalanced with a counterweight 45 so as to balance the tension of the tube 11 and the pressure exerted by the mobile pulley 43. Once a predefined traction is set on the tube, traction variations will be absorbed by the relative movement of the mobile pulley with respect to the fixed pulley, keeping the stretching traction unchanged.

The term "load cells" is used to describe a device comprising a freely turning pulley in partnership with a pressure sensor, e.g. a device marketed with the trademark Tension transducer ATB 05 made by ASA Automazione Torino.

Alternatively, the speeds $V_O$ and $V_A$ at the two ends of the length of tube being stretched can be measured, i.e. at the beginning and at the end of the tube length between the driving element 12 and the element is 13 or 16, from which tube stretching can be computed according to the formula expressed above.

These controlling devices act in order to keep the pressure exerted on the plastic material as constant as possible, intervening retroactively on the system after detecting variations of tube stretching or speed $V_O$ and/or $V_A$, by suitably increasing or decreasing the revolution speed and/or the braking intensity on the elements defining tube stretching. Preferably, these retroactive actions are controlled electronically.

According to a preferred embodiment, it appears particularly convenient to stretch the polymeric material in an area of the extrusion line where the tube has been adequately cooled so as to prevent risks of ovalization, but still having a temperature suitably high so the modulus of elasticity of the tube is still sufficiently low in order to favour stretching of the tube. The temperature at which stretching is performed will ensure that the modulus of elasticity of the tube material, according to this invention, is preferably between approximately 100 Mpa and approximately 2000 Mpa, more preferably between approximately 300 Mpa and approximately 1500 Mpa. For materials generally used to make said tubes, such temperature is generally between 20° C. and 100° C., preferably between 30° C. and 70° C.

The applicant has observed that with the method of the present invention, the longitudinal shrinking of the tube after production can be considerably limited, with special reference to storage. In particular, for a tube subjected to controlled traction according to this invention, the tube shrinking can be substantially reduced with respect to similar tubes which did not undergo a similar traction, during the aforesaid storage. More precisely, the applicant has observed that the shrinkage of a tube produced according to this method is at least 20% less than that of a similar tube made according to traditional processes.

The amount of stretching to which the tube is subjected consequently must be sufficiently high in order to ensure a certain reduction of shrinkage during storage; however, the stretching of the plastic material must be suitably limited so as such stretching not to excessively deteriorate the mechanical properties of the tube.

In addition to the traction value, the speed with which traction is applied also appears important. With reference to FIG. 17, the stretching traction application speed is particularly defined by the different tube speed in section S3 and in section S1. Typically, such application speed is between approximately 0.1 m/min and approximately 2 m/min.

For example, in practical observations, a PBT tube subjected to stretching by approximately 10% at a deformation speed of approximately 0.6 m/min presents the desired shrinking reduction characteristics during storage.

Materials used advantageously for making optical fibre tubes comprise polyalkyleneterephthalates and polyolefins, in particular polybutyleneterephthalate (PBT), polyethylene (PE) and polypropylene (PP).

Although the results of this invention should not be limited to specific theories, the applicant believes that a possible reason for the reduction in longitudinal tube shrinkage after production should lie in the fact that tube stretching on the extrusion line, given the conditions in which this is performed, exceeds the elastic stretching limit value of the tube. Exceeding such elastic stretching limit (or yield point) in the tube, or in a part of its length, causes permanent deformation, which could be the cause of the reduction in observed shrinkage in the tube during the stages following production.

An example of an optical fibre cable made according to this invention is shown in FIG. 14. The cable in FIG. 14 presents, in the innermost radial position, a central member 32, made typically of fibre glass, coated with a polymer jacket 28, e.g. polyethylene. The cable presents one or more PE, PBT or PP tubes 26, which may be embedded in a filler 33, loosely containing optical fibres 25, also embedded in a filler 33. The filler 33, if required, can be replaced with water-swellable powder or other water-blocking material. A predefined stretching was applied to tubes 26, according to this invention. The tubes 26 are coated with a reinforcement layer 29, typically made of Kevlar® or glass fibre, comprising two sheath cutting strands 34, located longitudinally with respect to the cable. Finally, the cable comprises a corrugated metal tape 30 (if required) and an external jacket 27, typically made of polyethylene.

Another example according to the present invention is shown in FIG. 15. It consists of a cable with single tube 26 loosely containing the optical fibres 25. In particular, FIG. 15 shows a section view of a fibrep optic cable which comprises a stretched central tube 26, according to this invention, containing the loose optical fibres 25 embedded in the filler 33, if required. The radius of the central tube 26 is surrounded by a reinforcement layer 29, comprising two sheath cutting strands 34, a corrugated tape 30 and an external polyethylene jacket 27.

An additional cable example is shown in FIG. 16. The structure of this cable is similar to that described in FIG. 15. The difference is that the optical fibres 25, loosely contained in the suitably stretched tube 26, are grouped in ribbons 31. Furthermore, two dielectric reinforcement elements 35, e.g. made of fibre glass, are next to the sheath cutting strands 34.

The insertion of additional components in the cable described above can be performed, according to known techniques, from the tube made according to this invention and for this reason are not described in greater detail.

The present invention is illustrated in greater detail in the following practical example.

EXAMPLE

A Vestodur 3000 polybutyleneterephthalate loose optical fibre tube was made using the equipment described in FIG. 2. Such tube had an internal diameter of approximately 2 mm and an external diameter of approximately 3 mm. It contained 6 optical fibres with a diameter of 250 $\mu$m. The tube 11 coming from the extruder 15 was stretched by suitably varying the feeding speed along the extrusion line, using a first drive pulley 12 and a second pulley 13 for braking purposes (as the set revolution speed was lower than that of the pulley 12). Furthermore, the congruence between optical fibre and tube was achieved on the pulley 12 by winding the tube by five turns on said wheel.

The pulley 12 and the pulley 13, both having a diameter of 250 mm, were positioned with the respective centres of revolution at a distance of 350 mm from each other to form the stretching device. Said device was positioned inside the cooling pool 10 (25 m long and 15 cm wide). The pulley 12 was located 2.7 m from the extruder. The coolant temperature in the pool 10 was kept constant at 20° C. The traction applied to the tube in the section between the extruder and the pulley 13 was less than 0.3 kg.

A 100 cm diameter drive wheel was located at the end of the cooling pool (out of the pool), at a distance of approximately 27 m from the extruder. The tube was wrapped on a reel with a diameter of 30 cm located at approximately 30 m from the extruder.

The tube production speed was set at approximately 60 m/min.

The revolution speed of the pulley 12 was set at approximately 76 g/min, corresponding to a linear speed of the tube $V_A$ of approximately 60 m/min, while the revolution speed of the pulley 13 was set at 75 g/min, corresponding to a linear speed of the tube $V_0$ equal to 59.5 g/min. In this case, the length of tube between the two pulleys 12 and 13 was subjected to a traction of approximately 2.3 kg and was stretched by approximately 1%.

Tube stretching was performed at a temperature of approximately 60° C., the temperature at which Vestodur 3000 has a modulus of elasticity of approximately 600 Mpa.

The drive wheel 5 was set at a revolution speed of approximately 19 g/min. The length of tube between the pulley 12 and the drive wheel was subjected to a traction of approximately 0.8 kg.

The tube was wound on the reel in random crossed turns.

At the end of the procedure the excess fibre value inside the tube was approximately 1%. Two km of tube were made in this way.

The applicant, with this method, produced a total of 9 tubes, according to this invention (a total of 18 km).

As a reference, 9 samples of tube (2 km each) were prepared using the system described above but without the stretching device. As previously described, the drive wheel 5 was located at a distance of 27 m from the extruder and followed by a reel. The wheel speed was set at 19 g/min, imposing a traction of approximately 0.8 kg on the tube.

The shrinkage values measured on the 9 samples made according to the invention and the 9 test samples after one week in storage, with the relative excess fibre resulting after shrinkage, are given in Tables 1 and 2.

TABLE 1

Tube with stretching (excess fibre before storage: 1%)

| Sample | Shrinkage percentage after one week in storage | Resulting excess fibre |
| --- | --- | --- |
| 1 | 0.2% | 1.2% |
| 2 | 0.2% | 1.2% |
| 3 | 0.3% | 1.3% |
| 4 | 0.3% | 1.3% |
| 5 | 0.3% | 1.3% |
| 6 | 0.4% | 1.4% |
| 7 | 0.4% | 1.4% |
| 8 | 0.5% | 1.5% |
| 9 | 0.5% | 1.5% |

TABLE 2

Tube without stretching (excess fibre before storage: 1%)

| Sample | Shrinkage percentage after one week in storage | Resulting excess fibre |
| --- | --- | --- |
| 10 | 0.6% | 1.6% |
| 12 | 0.6% | 1.6% |
| 13 | 0.8% | 1.8% |
| 14 | 0.8% | 1.8% |
| 15 | 0.8% | 1.8% |
| 16 | 1.0% | 2.0% |
| 17 | 1.4% | 2.4% |
| 18 | 1.6% | 2.6% |
| 19 | 1.9% | 2.9% |

After analysing the data shown in Tables 1 and 2, the applicant observed that shrinkage after one week in storage was on average 60% lower for the tubes which were subjected to a 1 % stretching, ranging from a mean value of approximately 1% to a mean value of approximately 0.4%, consequently reducing the excess fibre variations caused by shrinkage during storage.

What is claimed is:

1. A method for the production of a polymeric material tube associated with at least one optical fibre accommodated therein, which comprises the following steps:

a) feeding said at least one optical fibre along a path to an extruder;

b) extruding polymeric material around said optical fibre to form said tube; and (c) cooling the tube to a predetermined final temperature by the following steps comprising:

d) applying a first traction force to the tube containing said optical fibre in a first section of an extrusion line;

e) applying a second traction force to said tube in a second section of said extrusion line, with substantial lack of congruence between said fibre and said tube, said second traction force being greater than said first traction force; and (f) applying a third traction force to said tube in a third section of said extrusion line, said third traction force being less than said second traction force; wherein the tube temperature during the step in which said second traction force is applied undergoes a limited variation.

2. A method according to claim 1, wherein said second traction force is applied at a tube temperature at which the polymeric material has a modulus of elasticity that is less than approximately 2000 Mpa.

3. A method according to claim 2, wherein, at the tube temperature at which said second traction force is applied, the polymeric material has a modulus of elasticity that is between approximately 100 Mpa and approximately 2000 Mpa.

4. A method according to claim 3, wherein at the tube temperature at which said second traction force is applied, the polymeric material has a modulus of elasticity that is between approximately 300 Mpa and approximately 1500 Mpa.

5. A method according to claim 1, wherein said final temperature is less than approximately 40° C.

6. A method according to claim 5, wherein said final temperature is approximately 20° C.

7. A method according to claim 1, wherein the temperature variation in the length of tube subjected to said second traction force is less than approximately 10% the total thermal gap undergone by the tube along the extrusion line.

8. A method according to claim 1, wherein the temperature variation in the length of tube subjected to said second traction force is less than approximately 20° C.

9. A method according to claim 1, wherein the temperature variation in the length of tube subjected to said second traction force is less than approximately 10° C.

10. A method according to claim 1, wherein said second traction force is predetermined so as to cause a stretching of at least 1% when the polymeric material of the tube is polybutyleneterephthalate (PBT).

* * * * *